United States Patent
Kläser-Jenewein

(10) Patent No.: US 9,273,620 B2
(45) Date of Patent: Mar. 1, 2016

(54) METHOD FOR REGULATING A GAS ENGINE

(75) Inventor: Ludwig Kläser-Jenewein, Frickingen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 691 days.

(21) Appl. No.: 13/382,100

(22) PCT Filed: Jun. 16, 2010

(86) PCT No.: PCT/EP2010/003608
§ 371 (c)(1),
(2), (4) Date: Jan. 3, 2012

(87) PCT Pub. No.: WO2011/000474
PCT Pub. Date: Jan. 6, 2011

(65) Prior Publication Data
US 2012/0109499 A1    May 3, 2012

(30) Foreign Application Priority Data
Jul. 3, 2009    (DE) .......................... 10 2009 033 082

(51) Int. Cl.
*G06F 7/00*    (2006.01)
*F02D 41/00*    (2006.01)
(Continued)

(52) U.S. Cl.
CPC .......... *F02D 41/0027* (2013.01); *F02D 19/023* (2013.01); *F02D 29/06* (2013.01);
(Continued)

(58) Field of Classification Search
CPC ..... F02D 29/06; F02D 31/001; F02D 31/002; F02D 31/007; F02D 35/00; F02D 35/0023; F02D 41/00; F02D 41/0097; F02D 41/0002; F02D 41/02; F02D 41/14; F02D 41/1401; F02D 2009/0228; F02D 2009/023; F02D 2200/00; F02D 2200/04; F02D 2200/0406; F02D 2200/0404; F02D 2200/0614; F02D 2200/0616; F02D 2200/10; F02D 2200/1002; F02D 2200/1004; F02D 2200/101; F02D 2250/18; F02D 2250/24; F02D 41/1443; F02D 41/1497
USPC .......... 701/101–104; 123/525, 527, 528, 478, 123/480, 27 GE, 486, 675, 676, 352, 361, 123/406.25, 406.35, 406.36, 463, 1 A, 435, 123/436, 575; 73/114.37
See application file for complete search history.

(56) References Cited

U.S. PATENT DOCUMENTS 4,854,283 A * 8/1989 Kiyono ................. F02D 41/107
                                                            123/361
5,463,993 A * 11/1995 Livshits ................ F02D 31/005
                                                            123/339.11

(Continued)

FOREIGN PATENT DOCUMENTS

DE    102007056623 A    10/2004
DE        69926036         4/2006

(Continued)

*Primary Examiner* — Stephen K Cronin
*Assistant Examiner* — Brian Kirby
(74) *Attorney, Agent, or Firm* — Lucas & Mercanti, LLP; Klaus P. Stoffel

(57) ABSTRACT

The invention relates to a method for regulating a gas engine (1) having a generator (5), wherein a regulator torque is calculated by means of a speed regulator from a speed regulator deviation, wherein a target volume flow is calculated at least as a function of the regulator torque, wherein a fuel volume is determined as a proportion of a fuel-air mixture as a function of the target volume flow, and wherein a target receiver pipe pressure is also calculated as a function of the target volume flow as a guide parameter for a receiver pipe pressure regulating circuit for regulating the mixture pressure (pRRA, pRRB) of a fuel-air mixture in the receiver pipe (12, 13) above the inlet valves of the gas engine (1). The invention is characterized in that a deviation of the regulator torque from a generator torque is calculated and the target receiver pipe pressure is corrected using the deviation.

7 Claims, 4 Drawing Sheets

(51) Int. Cl.
  *F02D 29/06* (2006.01)
  *F02D 41/14* (2006.01)
  *F02D 19/02* (2006.01)
  *F02D 41/02* (2006.01)
  *F02M 21/02* (2006.01)

(52) U.S. Cl.
  CPC ........ *F02D41/1497* (2013.01); *F02D 41/0002* (2013.01); *F02D 41/0205* (2013.01); *F02D 2250/18* (2013.01); *F02D 2400/14* (2013.01); *F02M 21/0215* (2013.01); *Y02T 10/32* (2013.01)

(56) References Cited

U.S. PATENT DOCUMENTS

| | | | | |
|---|---|---|---|---|
| 5,577,474 A * | 11/1996 | Livshiz et al. | | 123/352 |
| 5,775,304 A * | 7/1998 | Kono | F02D 41/3082 | 123/357 |
| 6,021,755 A * | 2/2000 | Maddock et al. | | 123/361 |
| 6,340,005 B1 * | 1/2002 | Keast | F02B 43/02 | 123/27 GE |
| 6,522,024 B1 * | 2/2003 | Takaoka et al. | | 290/40 C |
| 6,945,221 B2 * | 9/2005 | Baeuerle | | 123/319 |
| 6,959,691 B2 * | 11/2005 | Ueda | F02D 31/003 | 123/339.19 |
| 7,082,924 B1 * | 8/2006 | Ruedin | F02D 31/002 | 123/352 |
| 7,150,264 B2 * | 12/2006 | Kobayashi et al. | | 123/376 |
| 7,174,250 B2 * | 2/2007 | Barba | F02D 41/0072 | 123/568.21 |
| 7,263,425 B2 * | 8/2007 | Bleile | F02D 41/18 | 701/102 |
| 7,650,222 B2 * | 1/2010 | Shiraishi | F02D 31/007 | 123/376 |
| 7,654,247 B2 * | 2/2010 | Shiraishi | F02D 31/002 | 123/403 |
| 7,747,378 B2 * | 6/2010 | Shiraishi | F02D 31/002 | 123/361 |
| 7,778,761 B2 | 8/2010 | Böckhoff et al. | | |
| 7,801,668 B2 * | 9/2010 | Ito | F02D 19/029 | 123/3 |
| 7,813,865 B2 * | 10/2010 | Martin | B60K 6/445 | 180/65.1 |
| 8,306,722 B2 * | 11/2012 | Whitney et al. | | 701/110 |
| 8,340,885 B2 * | 12/2012 | Baldauf et al. | | 701/103 |
| 8,364,381 B2 * | 1/2013 | Kar et al. | | 701/103 |
| 2004/0024518 A1 * | 2/2004 | Boley | F02D 41/18 | 701/104 |
| 2008/0140298 A1 * | 6/2008 | Morimoto et al. | | 701/103 |
| 2008/0162014 A1 * | 7/2008 | Shinohara et al. | | 701/102 |
| 2009/0076709 A1 * | 3/2009 | Shiraishi | F02D 31/007 | 701/103 |
| 2009/0076712 A1 | 3/2009 | Bockhoff et al. | | |
| 2009/0192698 A1 * | 7/2009 | Smuda | F02D 29/06 | 701/106 |
| 2009/0228186 A1 * | 9/2009 | Bischoff et al. | | 701/103 |
| 2010/0242937 A1 * | 9/2010 | Baldauf | F02D 31/002 | 123/704 |
| 2010/0256890 A1 * | 10/2010 | Baldauf | F02D 29/06 | 701/102 |
| 2012/0109499 A1 * | 5/2012 | Klaser-Jenewein | F02D 29/06 | 701/103 |

FOREIGN PATENT DOCUMENTS

| | | | | |
|---|---|---|---|---|
| DE | 102007045195 | * | 3/2009 | F02D 29/06 |
| DE | 102007045195 A | | 3/2009 | |
| DE | 102007045195 B3 * | | 3/2009 | F02D 41/14 |
| DE | 102007056623 B3 * | | 5/2009 | F02D 41/00 |
| DE | 102008006708 | | 8/2009 | |
| EP | 2039916 A | | 2/2008 | |

* cited by examiner

METHOD FOR REGULATING A GAS ENGINE

The present application is a 371 of International application PCT/EP2010/003608, filed Jun. 16, 2010, which claims priority of DE 10 2009 033 082.8, filed Jul. 3, 2009, the priority of these applications is hereby claimed and these applications are incorporated herein by reference.

BACKGROUND OF THE INVENTION

The invention concerns a method for automatically controlling a gas engine, in which both a fuel volume as a fraction of an air/fuel mixture is determined as a function of a set volume flow and a mixture pressure of the air/fuel mixture in the intake manifold upstream of the intake valves of the gas engine is determined as a function of a set volume flow.

Gas engines are often used as power plants for emergency generators, standby-ready units, or combined heat and power (CHP) installations. In these applications, the gas engine is operated at a combustion air ratio of, for example, 1.7, i.e., in a lean operation with air excess. Typically, the gas engine has a gas throttle valve for setting the gas fraction in the air/fuel mixture, a mixer for mixing the combustible gas with the air, a compressor as part of an exhaust gas turbocharger, a cooler and a mixture throttle valve. The mixture throttle valve serves to set the filling of the working cylinders and thus the torque of the gas engine. The filling of the working cylinders in turn is computed from the pressure of the air/fuel mixture with other parameters otherwise held constant, for example, at constant intake manifold temperature, at constant engine speed, and at constant combustion air ratio.

DE 10 2007 045 195 B3 discloses an automatic control method for a stationary gas engine with a generator, in which a speed controller uses a speed control deviation to determine a controller torque as a correcting variable. The controller torque in turn and the actual speed are used to determine a set volume flow by means of an efficiency input-output map. The set volume flow is both the input variable for controlling the gas throttle valve and the input variable for setting the mixture pressure in the intake manifold. The central element is the parallel control of the two control elements as a function of the same actuating variable, in this case, the set volume flow. The mixture pressure in the intake manifold is set via a cascade closed-loop pressure control system for the intake manifold. In this intake manifold closed-loop control system, the set intake manifold pressure represents the reference input and the measured intake manifold pressure is the controlled variable. The gas motor and the generator then constitute the controlled system. The set intake manifold pressure is computed from the set volume flow, taking into account the actual speed of the gas engine, the temperature in the intake manifold, and constants. Constant values include, for example, the combustion air ratio and a stoichiometric air requirement. The method we have been describing has been found to be effective in actual practice. However, the effect of different gas grades (volume fraction) within the same family of gases on the emission values remains critical.

DE 699 26 036 T2 also describes a method for automatically controlling a gas engine, in which a control signal for controlling the mixture throttle valve is computed from the speed control deviation by a PID controller. A correction value is determined, likewise as a function of the speed control deviation, and is then used to change the control signal for the gas throttle valve. However, the objective of the method is to suppress engine speed oscillations that develop after a change in the set engine speed.

SUMMARY OF THE INVENTION

Proceeding from an automatic control method with parallel control of the gas throttle valve and mixture throttle valve and cascade closed-loop pressure control system for the intake manifold, the objective of the invention is to minimize the effect of a different gas grade on the automatic control method.

The effect of a different gas grade is minimized by computing a deviation of the controller torque, i.e., the correcting variable of the speed controller, from the generator torque, and the set intake manifold pressure is corrected on the basis of this deviation. The deviation is a measure of the amount by which the energy content of the gas actually being used, for example, biogas, deviates from the energy content of the reference gas. The gas engine is calibrated to this reference gas on a test bench, with natural gas being used as the reference gas. For the gas being used on site, which occurs as a mixed gas comprising gases of a known family of gases, the fuel parameters must be known. These are the calorific value, the stoichiometric air requirement, and the density. The fuel parameters are then stored in the system as fixed values. The speed controller, by which the controller torque is computed, uses natural gas as the reference. The set intake manifold pressure is corrected by computing a corrected value from corrected input variables, namely a corrected set volume flow, a corrected combustion air ratio, and a corrected air requirement.

The corrected set volume flow is computed by multiplying the set volume flow by the square of the deviation. The corrected combustion air ratio is computed from a reference combustion air ratio and the deviation, where the reference combustion air ratio is computed by an input-output map as a function of the controller torque and the actual speed of the gas engine. The corrected air requirement is determined by a recursive method, likewise as a function of the deviation.

The use of the method of the invention offers the advantage that despite variation of the gas grade, the power output of the gas engine remains unchanged. Therefore, a gas engine that is being operated with, for example, biogas, has the same power output as a gas engine operated with natural gas. If the volume fraction of the combustible gas varies, the set intake manifold pressure is adjusted by the method of the invention, so that the power output remains unchanged in this case as well. Therefore, the volume fraction does not have to be known. As a consequence, the pollutant emissions are the same as for the reference gas. Since the method is based on the same sensor signals that are already being used, no modification or supplementation of the sensor technology or of the engine control unit is necessary. Therefore, gas engines that have already been delivered can be retrofitted with the method of the invention without any problem, for example, during maintenance. Compared to automatic control of the combustion air ratio, parallel control of the gas throttle valve and the mixture throttle valves as a function of the same actuating variable offers the advantage of a reduced response time and more precise transient oscillation with improved adjustability of the total system. As a result, smooth automatic control of the engine output is obtained.

The drawings show a preferred embodiment of the invention.

DETAILED DESCRIPTION OF THE INVENTION

Figure 1:
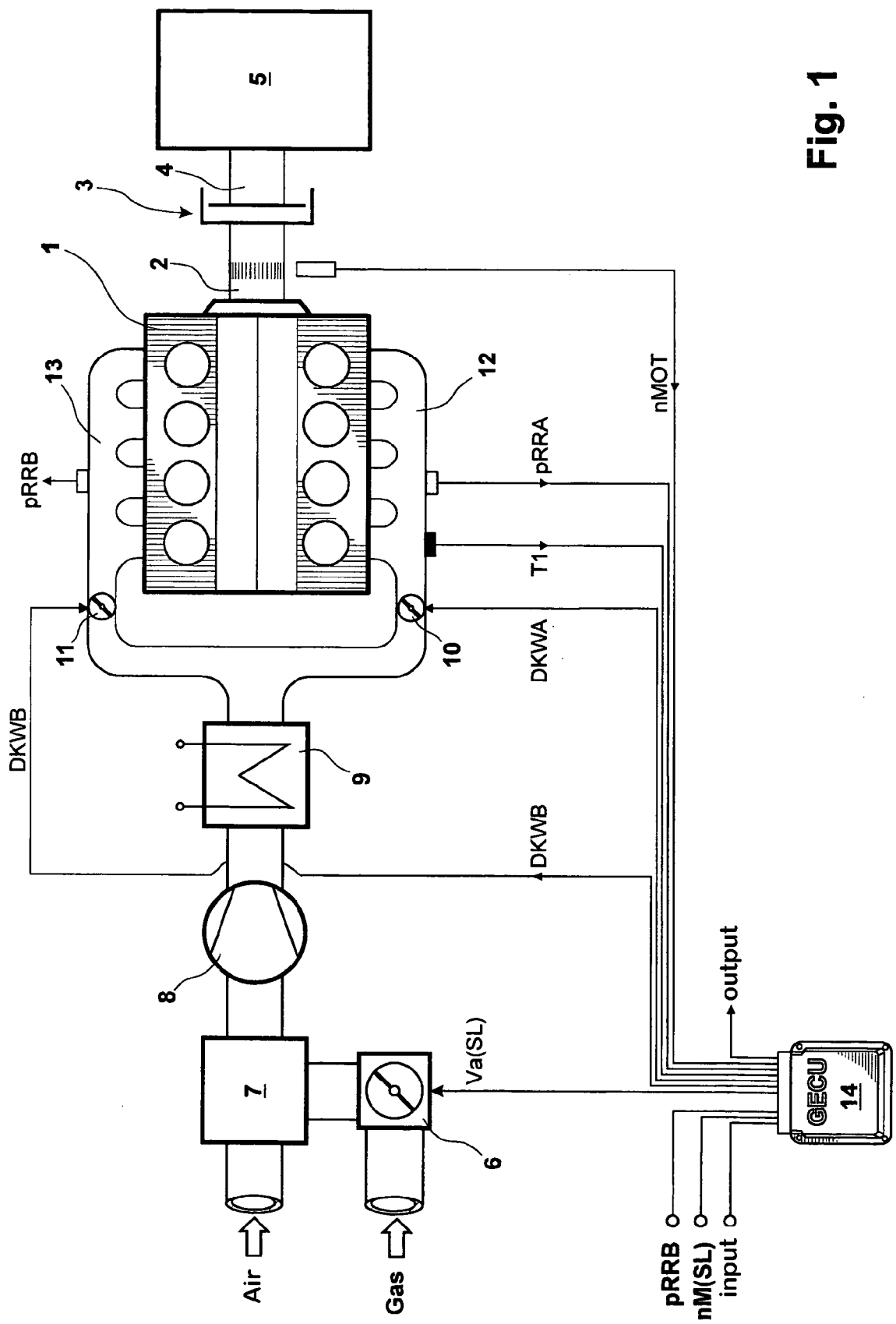
FIG. 1 is a system diagram.

FIG. 1 is a system diagram of a gas engine 1 in V configuration with a generator 5. The generator 5 is powered by the gas engine 1 via a shaft 2, a coupling 3, and a shaft 4. Electric power is generated by the generator 5 and fed into an electric network. The following mechanical components are assigned to the gas engine 1: a gas throttle valve 6 for setting a supplied volume flow or fuel, for example, biogas, a mixer 7 for mixing air and fuel, a compressor 8 as part of an exhaust gas turbocharger, a cooler 9, an A-side mixture throttle valve 10 in the A-side intake manifold 12, and a B-side mixture throttle valve 11 in the B-side intake manifold 13 of the gas engine 1. Naturally, instead of the throttle valves, i.e., the gas throttle valve 6 and the mixture throttle valves 10 and 11, it is also possible to use other control devices, for example, a venturi mixer or a rotary valve.

The mode of operation of the gas engine 1 is determined by an electronic engine control unit 14 (GECU). The electronic engine control unit 14 contains the usual components of a microcomputer system, for example, a microprocessor, interface adapters, buffers and memory components (EEPROM, RAM). Operating characteristics that are relevant to the operation of the gas engine 1 are applied in the memory components in the form of input-output maps/characteristic curves. The electronic engine control unit 14 uses these to compute the output variables from the input variables. The following input variables are shown in FIG. 1: the A-side intake manifold pressure pRRA, a mixture temperature T1, a B-side intake manifold pressure pRRB, the (unfiltered) raw values of the engine speed nMOT of the gas engine 1, a set speed nM(SL), which is preset by a system controller (not shown), and an input variable EIN. The input variable EIN is representative of the other input signals, for example, the oil temperature. The following are shown as output variables of the electronic engine control unit 14: an adjusted set volume flow Va(SL) for controlling the gas throttle valve 6, an A-side mixture throttle angle DKWA for controlling the A-side mixture throttle valve 10, a B-side mixture throttle angle DKWB for controlling the B-side mixture throttle valve 11, and a signal AUS. The signal AUS is representative of the other signals for automatically controlling the gas engine 1.

The system has the following general functionality: A fuel volume flow supplied to the mixer 7 is adjusted by the position of the gas throttle valve 6. The position of the A-side mixture throttle valve 10 defines an A-side mixture volume and thus the A-side intake manifold pressure pRRA in the A-side intake manifold 12 upstream of the intake valves of the gas engine 1. The B-side intake manifold pressure pRRB upstream of the intake valves of the gas engine 1 is determined by the B-side mixture throttle valve 11.

Figure 2:
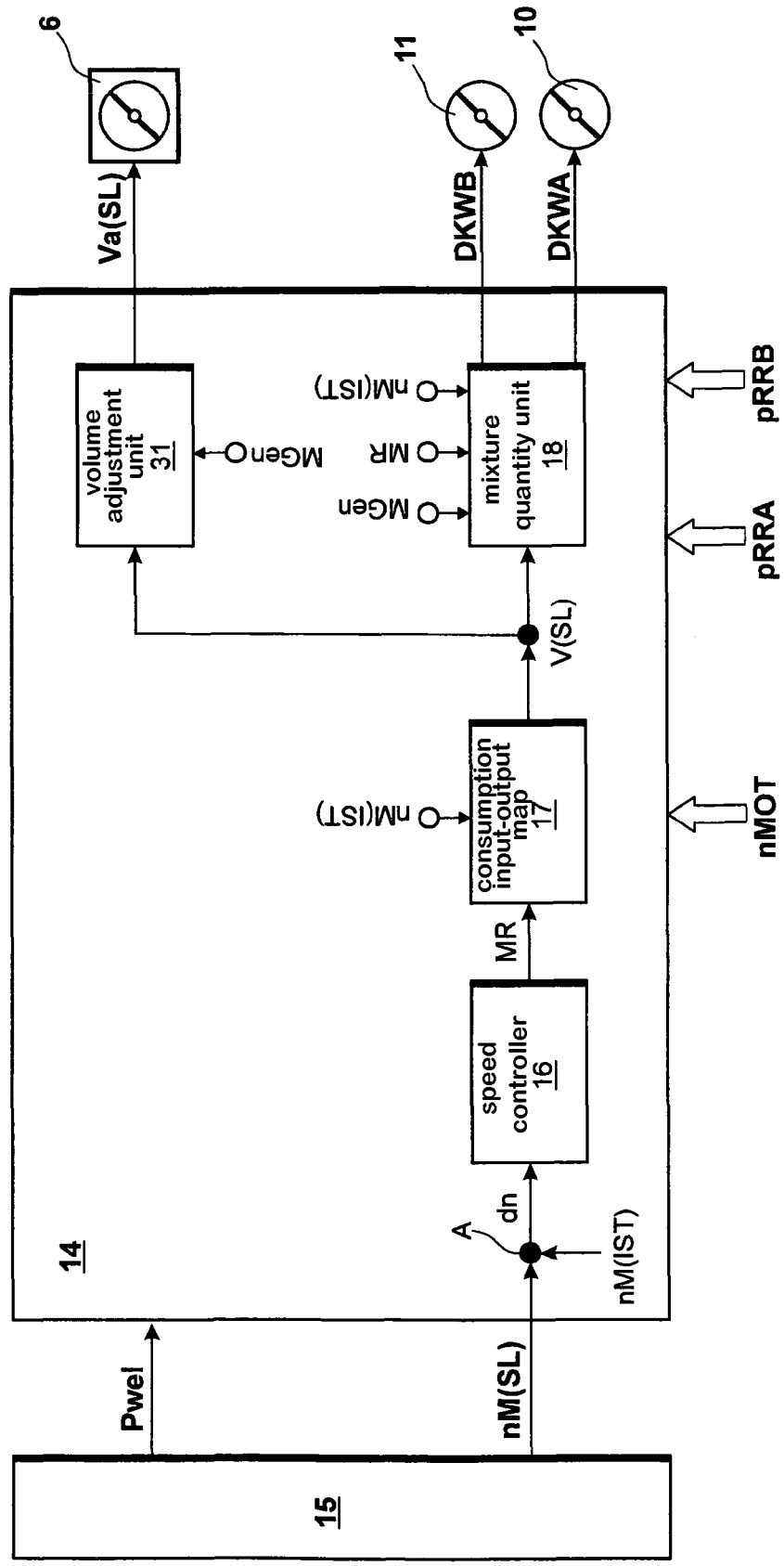
FIG. 2 is a block diagram.

FIG. 2 shows a block diagram for controlling the two mixture throttle valves 10 and 11 and the gas throttle valve 6. The system controller of the generator is identified by reference number 15. Reference number 14 identifies the electronic engine control unit in the form of a reduced block diagram, in which the depicted elements represent the program steps of an executable program. The input variables of the electronic engine control unit 14 that are shown in this drawing are the raw values of the engine speed nMOT, the A-side intake manifold pressure pRRA, the B-side intake manifold pressure pRRB, the set speed nM(SL), and an active electric power Pwel. The set speed nM(SL) and the active electric power Pwel are supplied by the system controller 15. The electronic engine control unit 14 computes the generator torque MGen from the active electric power Pwel. The electronic engine control unit 14 uses the raw values of the engine speed nMOT to compute the actual speed by means of a speed filter (not shown). The output variables of the electronic engine control unit 14 that are shown in FIG. 2 are the A-side mixture throttle angle DKWA for controlling the A-side mixture throttle valve 10, the B-side mixture throttle angle DKWB for controlling the B-side mixture throttle valve 11, and the adjusted set volume flow Va(SL) for controlling the gas throttle valve 6.

The set speed nM(SL), for example, 1500 rpm, which corresponds to a frequency of 50 Hz, is preset by the system controller 15 as the desired output. At a point A, a speed control deviation dn is computed from the set speed nM(SL) and the actual speed mM(IST). A speed controller 16 in turn uses the speed control deviation dn to compute the controller torque MR as a correcting variable. In practice, the speed controller 16 is realized as a PIDT1 controller. The controller torque MR is the first input variable of a consumption input-output map 17. The second input variable is the actual speed nM(IST). A set volume flow V(SL) is determined by the consumption input-output map 17 as a function of the two input variables. The set volume flow V(SL) is the input variable for both a volume adjustment unit 31 and a mixture quantity unit 18. The set volume flow V(SL) is adjusted by the volume adjustment unit 31 at least as a function of the generator torque MGen. The output variable of the volume adjustment unit 31 is an adjusted set volume flow Va(SL), which is the input variable of the gas throttle valve 6. An electronic processing unit integrated in the gas throttle valve 6 assigns to the value of the adjusted set volume flow Va(SL) a corresponding cross-sectional area and a corresponding angle. A fuel volume flow as a gas fraction of the air/fuel mixture is set by the gas throttle valve 6.

Figure 3:
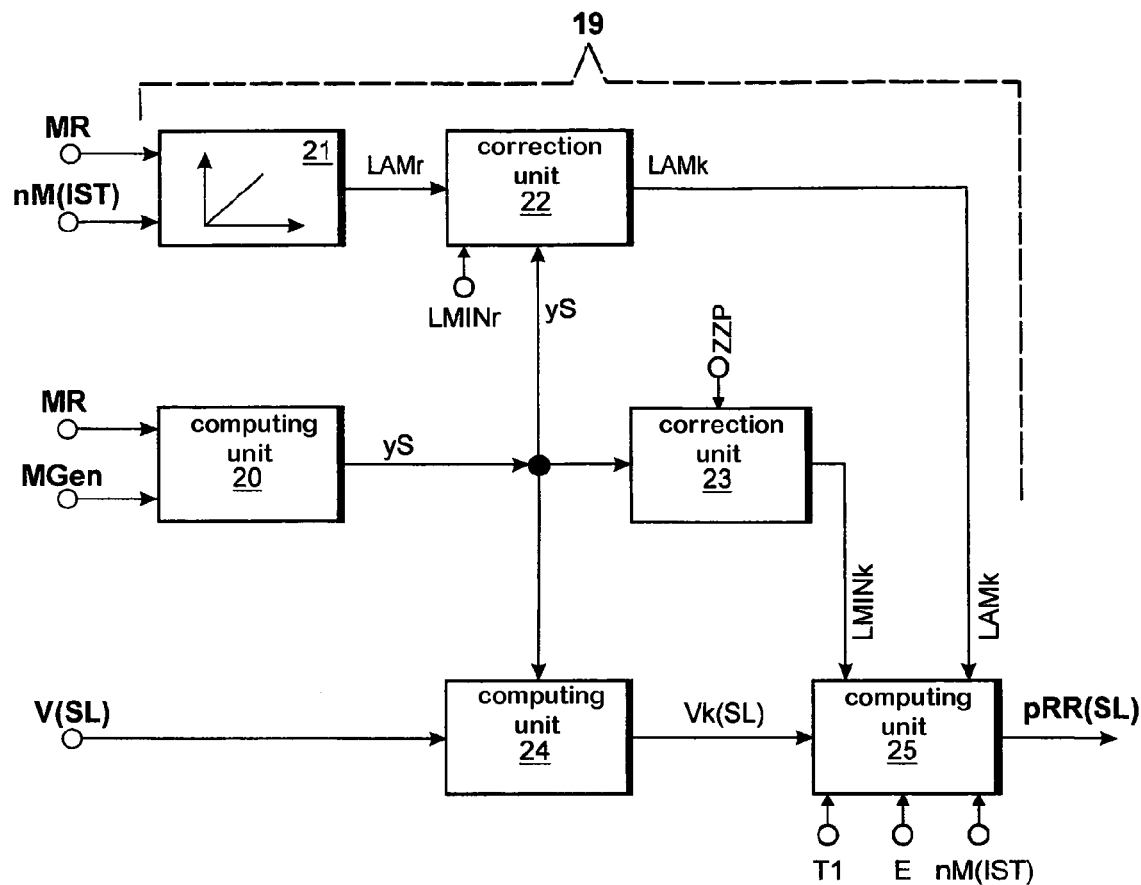
FIG. 3 shows the computation of the set intake manifold pressure as a block diagram.

The mixture quantity unit 18 combines the computation of the set intake manifold pressure and a cascade closed-loop pressure control system for the intake manifold. The conversion of the set volume flow V(SL) in the mixture quantity unit 18 is shown in FIG. 3 and will be described with reference to that drawing. As shown in FIG. 2, the other input variables of the mixture quantity unit 18 are the generator torque MGen, the controller torque MR, the actual speed nM(IST), and the two intake manifold pressures pRRA and pRRB as controlled variables of the closed-loop pressure control system for the intake manifold. The A-side mixture throttle angle DKWA and the B-side mixture throttle angle DKWB are computed by the mixture quantity unit 18. The A-side mixture throttle angle DKWA controls the A-side mixture throttle valve 10, by which the A-side intake manifold pressure pRRA is automatically controlled. The B-side mixture throttle angle DKWB controls the B-side mixture throttle valve 11, by which the B-side intake manifold pressure pRRB is automatically controlled. As is clear from the figure, a central element is the parallel control of the gas throttle valve and the mixture throttle valves as a function of the same actuating variable, here the set volume flow V(SL).

The block diagram in FIG. 3 shows a functional block 19 for determining the set intake manifold pressure pRR(SL), which is part of the mixture quantity unit 18. The input variables of the functional block 19 are the controller torque MR computed by the speed controller 16 (FIG. 2), the actual speed nM(IST), the generator torque MGen, and the set volume flow V(SL). The output variable is the set intake manifold pressure pRR(SL), which is then the reference input for the following intake manifold closed-loop pressure control system. An intake manifold closed-loop pressure control system of this type is described, for example, in DE 10 2007 045 195 B3. A computing unit 20 uses the controller torque MR and the generator torque MGen to determine a deviation yS by computing the quotient MR/MGen. The deviation yS is a measure of the amount by which the energy content of the fuel actually being used differs from the energy content of the reference fuel. The unit of energy content is given in kilowatt-hours per standard cubic meter of gas (kWh/Nm$^3$). The system is set to natural gas as the reference fuel by the manufacturer of the gas engine. If natural gas is used, then the quotient MR/MGen is equal to one. If, on the other hand, a gas with a lower energy content is used, for example, biogas, then the quotient can be in the range of 1.4 to 1.5, depending on the inert gas fraction.

A reference combustion-air ratio LAMr is assigned to the controller torque MR and the actual speed nM(IST) by an input-output map 21. The reference combustion-air ratio LAMr is the first input variable of a correction unit 22. The second input variable is a reference air requirement LMINr, which in the present case is constant. The reference air requirement LMINr represents the stoichiometric air requirement for the complete combustion of one cubic meter of the reference gas. The third input variable is the deviation yS. The correction unit 22 uses the following relation to compute the corrected combustion air ratio LAMk:

$$LAMk = LAMr + [(1-yS^2)/LMINr] \quad (1)$$

Figure 4:
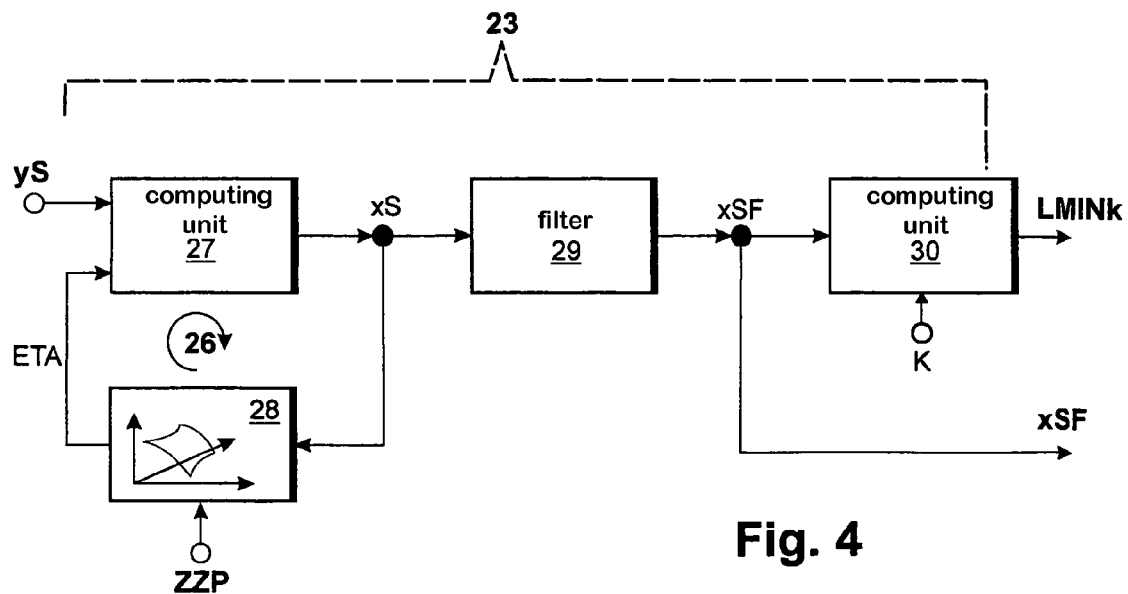
FIG. 4 shows the computation of the corrected air requirement as a block diagram.

The output variable of the correction unit 22, i.e., the corrected combustion air ratio LAMk, is the first corrected input variable of a computing unit 25 for determining the set intake manifold pressure pRR(SL). A correction unit 23 computes a corrected air requirement LMINk as a function of the deviation yS. The correction unit 23 is shown in FIG. 4 and will be described with reference to that drawing. The corrected air requirement LMINk is the second corrected input variable of the computing unit 25. The third corrected input variable of the computing unit 25 is a corrected set volume flow Vk(SL), which is computed in computing unit 24 by multiplying the set volume flow V(SL) by the square of the deviation yS. The computing unit 25 computes the set intake manifold pressure pRR(SL) by the following relation:

$$pRR(SL) = 2 \cdot yS^2 \cdot T1 \cdot p0 \cdot [1 + LAMk \cdot LMINk] \cdot Vk(SL) / [LG \cdot VH \cdot nM(IST) \cdot T0] \quad (2)$$

where yS is the deviation, T1 is the temperature measured in the intake manifold, p0 is the standard air pressure at mean sea level (1013 hPa), LAMk is the corrected combustion air ratio, LMINk is the corrected air requirement, Vk(SL) is the corrected set volume flow, LG is the volumetric efficiency, VH is the stroke volume of the cylinder, nM(IST) is the actual speed of the gas engine, and T0 is standard temperature (273.15K). In the drawing (FIG. 3), the volumetric efficiency LG, the stroke volume VH, and the standard temperature T0 are combined under the reference letter E. As is evident from FIG. 3, the set intake manifold pressure pRR(SL) is corrected by using corrected input variables. The deviation yS proved to be the most useful correction variable, since it is a measure of the amount by which the energy content of the gas that is actually used, for example, biogas with a methane gas content of 45 vol. %, deviates from the energy content of the reference gas, which in the present case is natural gas.

FIG. 4 is a block diagram that shows the computation of the corrected air requirement. The input variables are the deviation yS and the ignition point ZZP. The output variables are the corrected air requirement LMINk and a filtered mixing parameter xSF. The corrected air requirement LMINk is computed by means of a recursive loop 26. A mixing parameter xS is computed by a computing unit 27 from the deviation yS and an efficiency ratio ETA. In the first pass through the recursive loop, the initial value of the efficiency ratio is ETA=1. The mixing parameter is computed by the following relation:

$$xS = \{HUO - [HUr \cdot ETA \cdot (1/yS^2)]\} / [HUO - HUU] \quad (3)$$

where xS is the mixing parameter. The constant HUO represents the greatest calorific value to be adopted for the fuel that is actually being used, for example, biogas. The constant HUU represents the smallest calorific value to be adopted for the fuel that is actually being used. The constant HUr represents the calorific value of the reference fuel, here: natural gas. To determine the constants HUO and HUU, it is necessary to know the provenience and the family of gases to which the fuels belong. These constants are not varied in the operation of the gas engine. The mixing parameter xS is then supplied to an efficiency input-output map 28, which determines a new efficiency ratio ETA as a function of the mixing parameter xS and the ignition point ZZP. The efficiency ratio ETA can be obtained as the ratio of an actual efficiency to a reference efficiency determined on the test bench with the use of the reference fuel (natural gas). The new efficiency ratio ETA is then fed back to the computing unit 27, in which the mixing parameter xS is then recomputed from the new efficiency ratio ETA by formula (3). The recursive loop is repeatedly passed through until a termination criterion is recognized. A termination criterion occurs when the recursive loop 26 has been passed through i times. Alternatively, a termination criterion is present when the difference between two recursively computed mixing parameters is less than a limit. When the termination criterion has been recognized, the last mixing parameter computed is set as the valid value. The recursive loop 26 is followed by a filter 29, typically a PT1 filter, which filters the mixing parameter that has been set as valid. A computing unit 30 uses the filtered mixing parameter xSF and constant values K to compute the corrected air requirement LMINk, which is further processed in the functional block 19 shown in FIG. 3. The computation is carried out with the following relation:

$$LMINk = xSF \cdot LMINu + (1-xSF) \cdot LMINo \quad (4)$$

where LMINu is the minimum air requirement of the fuel that is actually used and LMINo is the maximum air requirement of the fuel that is actually used, which are the constants. The mixing parameter xSF is further processed internally, for example, for adjustment of the fuel density and the ignition point.

Figure 5:
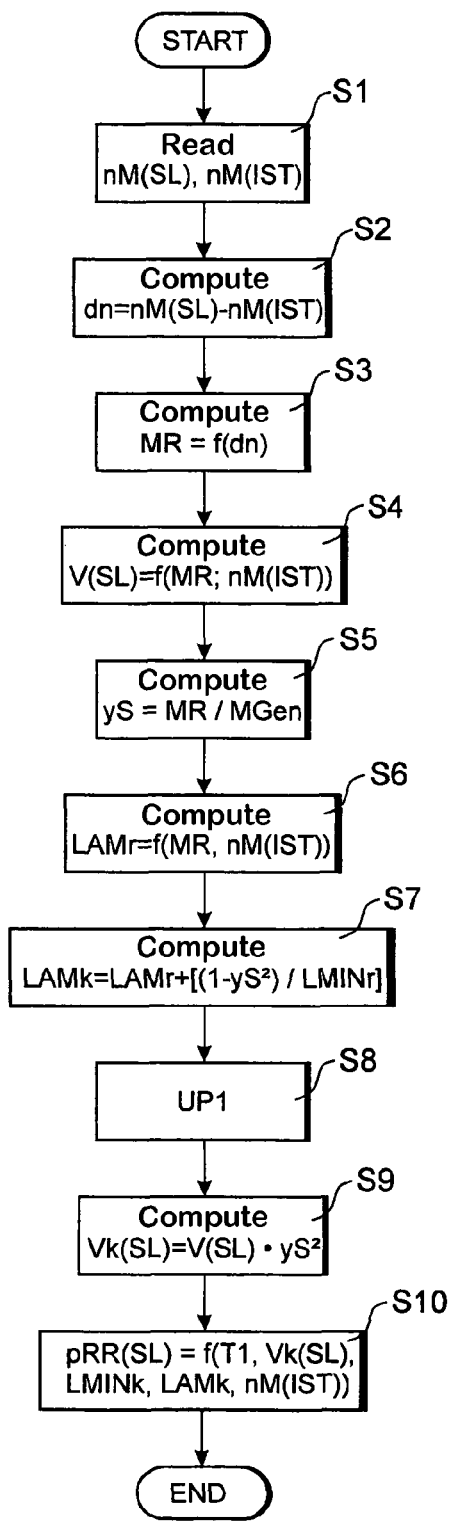
FIG. 5 is a program flowchart.
Figure 6:
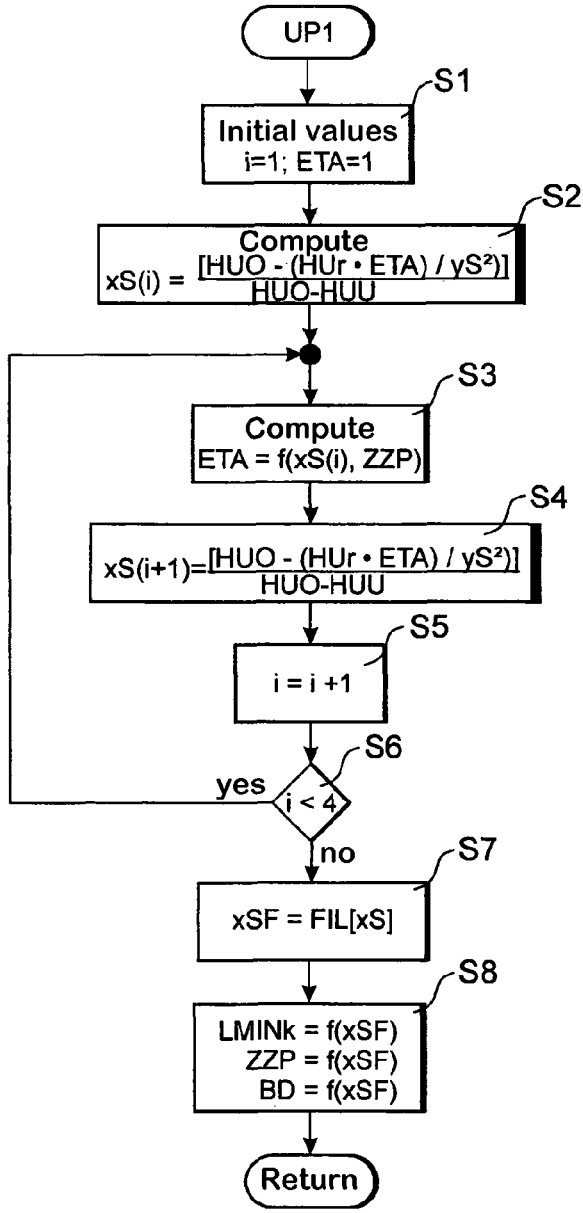
FIG. 6 is a subroutine.

FIG. 5 is a program flowchart of the method of the invention. At S1 the actual speed nM(IST) and the set speed nM(SL) are read in, and then at S2 they are used to compute the speed control deviation dn. At S3 the speed controller uses the speed control deviation dn to determine the controller torque MR as a correcting variable, for example, by means of a PIDT1 algorithm. At S4 the consumption input-output map 17 (FIG. 2) computes the set volume flow V(SL) as a function of the controller torque MR and the actual speed nM(IST). At S5 the deviation yS is determined from the controller torque MR and the generator torque MGen by computation of the quotient MR/MGen. At S6 a reference combustion air ratio LAMr is assigned to the controller torque MR and the actual speed nM(IST) by an input-output map 21 (FIG. 3). At S7 formula (1) is then used to determine the corrected combustion air ratio LAMk. Then at S8 control passes to a subroutine UP1 for computation of the corrected air requirement LMINk. The subroutine UP1 is shown in FIG. 6 and will be described in connection with FIG. 5. After control passes back to the main program, then at S9 the corrected set volume flow Vk(SL) is computed from the set volume flow V(SL) and the deviation yS. At S10 formula (2) is used to compute the set intake manifold pressure pRR(SL) as a function of the corrected set volume flow Vk(SL), the corrected air requirement LMINk, and the corrected combustion air ratio LAMk. The program then ends.

FIG. 6 shows the subroutine UP1 for computing the corrected air requirement LMINk by a recursive method. At S1 a running variable I and the efficiency ratio ETA are set to the initial value of one. At S2 the mixing parameter xS is computed by formula (3). The constant HUO represents the greatest calorific value to be adopted for the fuel that is actually being used, for example, biogas. The constant HUU represents the smallest calorific value to be adopted for the fuel that is actually being used. The constant HUr represents the calorific value of the reference fuel, here: natural gas. To determine the constants HUO and HUU, it is necessary to know the provenience and the family of gases to which the fuels belong. These constants are not varied in the operation of the gas engine. Then at S3 an input-output map 28 (FIG. 4) assigns a new efficiency ratio ETA to the mixing parameter and the ignition point ZZP. The efficiency ratio ETA can be obtained as the quotient of an actual efficiency and a reference efficiency. At S4 a new mixing parameter is determined with the previously computed new efficiency ratio ETA and set as the new mixing parameter. On the first pass through the loop, the new mixing parameter is then xS(2). The running variable i is then increased by one at S5, and its value is interrogated at S6. If the running variable i is less than four (interrogation result at S6: yes), then the program flow continues at S3. If the interrogation result at S6 is negative, the last computed mixing parameter is set as the valid mixing parameter. The valid mixing parameters computed in this way within an interval of time are filtered at S7, for example, by a PT1 filter. The result is the filtered mixing parameter xSF. At S8 the corrected air requirement LMINk is computed as a function of the filtered mixing parameter xSF. The filtered mixing parameter xSF is further processed internally, for example, for adjustment of the fuel density BD and the ignition point ZZP. Control then returns to the main program of FIG. 5 at S8.

The invention was described with reference to a gas engine that powers a generator. Instead of a generator, a standby-ready unit or a combined heat and power (CHP) installation can also be used. In this case, the generator torque MGen then corresponds to the torque delivered by, for example, the standby-ready unit.

LIST OF REFERENCE NUMBERS 1 generator
2 shaft
3 coupling
4 shaft
5 generator
6 gas throttle valve
7 mixer
8 compressor
9 cooler
10 A-side mixture throttle valve
11 B-side mixture throttle valve
12 A-side intake manifold
13 B-side intake manifold
14 electronic engine control unit (GECU)
15 system controller
16 speed controller
17 consumption input-output map
18 mixture quantity unit
19 functional block
20 computing unit
21 input-output map
22 correction unit
23 correction unit
24 computing unit
25 computing unit
26 recursive loop
27 computing unit
28 efficiency input-output map
29 filter
30 computing unit
31 volume adjustment unit

The invention claimed is:

1. A method for automatically controlling a gas engine, comprising the steps of: computing a controller torque (MR) from a speed control deviation by a speed controller; computing a set volume flow (V(SL)) at least as a function of the controller torque (MR); setting a fuel volume as a fraction of an air/fuel mixture as a function of the set volume flow (V(SL)) by adjusting a gas control device; computing a set intake manifold pressure (pRR(SL)) as a reference input for an intake manifold closed-loop pressure control system as a function of the set volume flow (V(SL)); automatically controlling a mixture pressure (pRRA, pRRB) of an air/fuel mixture in the intake manifold upstream of intake valves of the gas engine by adjusting a mixture control device of the intake manifold closed-loop pressure control system based on the set intake manifold pressure; computing a deviation (yS) of the controller torque (MR) from a generator torque (MGen); correcting the set intake manifold pressure (pRR(SL)) based on the deviation (yS), including correcting the set intake manifold pressure (pRR(SL)) by correcting input variables of the set intake manifold pressure by the deviation (yS), computing the set intake manifold pressure (pRR(SL)) at least from a corrected set volume flow (Vk(SL)), a corrected combustion air ratio (LAMk), and a corrected air requirement (LMINk), and computing the corrected set volume flow (Vk(SL)) by multiplying the set volume flow (V(SL)) by the square of the deviation (yS), and using the corrected set volume flow to adjust the gas control device and the mixture control device to respectively control the fuel volume flow and the mixture pressure.

2. A method for automatically controlling a gas engine, comprising the steps of: computing a controller torque (MR) from a speed control deviation by a speed controller; computing a set volume flow (V(SL)) at least as a function of the controller torque (MR); setting a fuel volume as a fraction of an air/fuel mixture as a function of the set volume flow (V(SL)) by adjusting a gas control device; computing a set intake manifold pressure (pRR(SL)) as a reference input for an intake manifold closed-loop pressure control system as a function of the set volume flow (V(SL)); automatically controlling a mixture pressure (pRRA, pRRB) of an air/fuel mixture in the intake manifold upstream of intake valves of the gas engine by adjusting a mixture control device of the intake manifold closed-loop pressure control system based on the set intake manifold pressure; computing a deviation (yS) of the controller torque (MR) from a generator torque (MGen); correcting the set intake manifold pressure (pRR(SL)) based on the deviation (yS), including correcting the set intake manifold pressure (pRR(SL)) by correcting input variables of the set intake manifold pressure by the deviation (yS), computing the set intake manifold pressure (pRR(SL)) at least from a corrected set volume flow (Vk(SL)), a corrected combustion air ratio (LAMk), and a corrected air requirement (LMINk), and computing the corrected combustion air ratio (LAMk) at least from a reference combustion air ratio (LAMr) and the deviation (yS), the reference combustion air ratio (LAMr) being computed by an input-output map as a function of the controller torque (MR) and actual speed (nM (IST)), and using the corrected set volume flow to adjust the gas control device and the mixture control device to respectively control the fuel volume flow and the mixture pressure.

3. A method for automatically controlling a gas engine, comprising the steps of: computing a controller torque (MR) from a speed control deviation by a speed controller; computing a set volume flow (V(SL)) at least as a function of the controller torque (MR); setting a fuel volume as a fraction of an air/fuel mixture as a function of the set volume flow (V(SL)) by adjusting a gas control device; computing a set intake manifold pressure (pRR(SL)) as a reference input for an intake manifold closed-loop pressure control system as a function of the set volume flow (V(SL)); automatically controlling a mixture pressure (pRRA, pRRB) of an air/fuel mixture in the intake manifold upstream of intake valves of the gas engine by adjusting a mixture control device of the intake manifold closed-loop pressure control system based on the set intake manifold pressure; computing a deviation (yS) of the controller torque (MR) from a generator torque (MGen); correcting the set intake manifold pressure (pRR(SL)) based on the deviation (yS), including correcting the set intake manifold pressure (pRR(SL)) by correcting input variables of the set intake manifold pressure by the deviation (yS), computing the set intake manifold pressure (pRR(SL)) at least from a corrected set volume flow (Vk(SL)), a corrected combustion air ratio (LAMk), and a corrected air requirement (LMINk), and computing the corrected air requirement (LMINk) by computing a first mixing parameter as a function of the deviation (yS), by computing an efficiency ratio (ETA) from the first mixing parameter and an ignition point (ZZP), by correcting the first mixing parameter recursively by the efficiency ratio (ETA), by setting a last mixing parameter computed as a valid mixing parameter on recognition of a termination criterion, and by multiplying the valid mixing parameter by constants and setting the result as the corrected air requirement (LMINk), and using the corrected set volume flow to adjust the gas control device and the mixture control device to respectively control the fuel volume flow and the mixture pressure.

4. The method in accordance with claim 3, wherein a termination criterion is present if the recursive loop has been passed through i times or if a difference between two computed mixing parameters (xS(i), xS(i+1)) is less than a limit (GW).

5. The method in accordance with claim 3, including filtering the valid mixing parameters.

6. The method in accordance with claim 1, including computing the deviation (yS) by computing a quotient of the controller torque (MR) and the generator torque (MGen).

7. The method in accordance with claim 1, including automatically controlling an A-side mixture pressure (pRRA) in an A-side intake manifold by a first intake manifold closed-loop pressure control system as a function of the set intake manifold pressure (pRR(SL)), and automatically controlling a B-side mixture pressure (pRRB) in an B-side intake manifold by a second intake manifold closed-loop pressure control system, also as a function of the set intake manifold pressure (pRR(SL)).

* * * * *